(12) United States Patent
Lee et al.

(10) Patent No.: US 9,467,516 B2
(45) Date of Patent: Oct. 11, 2016

(54) METHOD AND APPARATUS FOR MANAGING RESOURCE

(71) Applicant: ELECTRONICS AND TELECOMMUNICATIONS RESEARCH INSTITUTE, Daejeon (KR)

(72) Inventors: Hyung Kyu Lee, Daejeon (KR); Soon Hyun Kwon, Incheon (KR); Dong-Hwan Park, Daejeon (KR); Kwang Soo Kim, Daejeon (KR); Yoon Sik Yoo, Daejeon (KR); Jin Chul Choi, Daejeon (KR); Sunjin Kim, Daejeon (KR); Hyochan Bang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/314,225

(22) Filed: Jun. 25, 2014

(65) Prior Publication Data

US 2015/0007192 A1  Jan. 1, 2015

(30) Foreign Application Priority Data

Jul. 1, 2013 (KR) .......................... 10-2013-0076697
Apr. 3, 2014 (KR) .......................... 10-2014-0040215

(51) Int. Cl.

| G06F 9/46 | (2006.01) |
|---|---|
| H04L 29/08 | (2006.01) |
| G06F 9/52 | (2006.01) |
| H04W 4/00 | (2009.01) |

(52) U.S. Cl.
CPC ................ H04L 67/12 (2013.01); G06F 9/52 (2013.01); *H04W 4/005* (2013.01)

(58) Field of Classification Search
CPC .......................................................... G06F 9/52
USPC .............................. 718/104; 700/99; 709/226
See application file for complete search history.

(56) References Cited

U.S. PATENT DOCUMENTS

| 7,937,349 B2 * | 5/2011 | Pucher ............................ 706/45 |
| 2004/0010491 A1 * | 1/2004 | Riedinger ......................... 707/3 |

(Continued)

FOREIGN PATENT DOCUMENTS

| KR | 1020130008720 A | 1/2013 |
| KR | 1020130042444 A | 4/2013 |

OTHER PUBLICATIONS

Roussey et al., "Chapter 2: An Introduction to Ontologies and Ontology Engineering", 2011.*

(Continued)

*Primary Examiner* — Phillip H Nguyen
(74) *Attorney, Agent, or Firm* — Ladas & Parry LLP

(57) ABSTRACT

According to an exemplary embodiment of the present invention, a method for managing a resource using an apparatus for managing a resource is provided. The apparatus for managing a resource generates a first instance for a first community using a first ontology class about communities including at least one resource as a member according to a goal. The apparatus for managing a resource generates a second instance for a first resource using a second ontology class about resources. Further, the apparatus for managing a resource estimates a relation between the first instance and the second instance.

3 Claims, 10 Drawing Sheets

(56) References Cited

U.S. PATENT DOCUMENTS

| | | | |
|---|---|---|---|
| 2006/0149905 A1* | 7/2006 | Park | H04L 67/12 711/141 |
| 2007/0282659 A1* | 12/2007 | Bailey et al. | 705/9 |
| 2009/0316594 A1* | 12/2009 | Kim | H04L 67/327 370/252 |
| 2010/0007483 A1* | 1/2010 | Oh | H04L 67/36 340/521 |
| 2010/0201535 A1* | 8/2010 | Heo | G01S 13/878 340/686.1 |
| 2011/0270882 A1 | 11/2011 | Jung et al. | |
| 2013/0030827 A1* | 1/2013 | Snyder et al. | 705/2 |
| 2013/0094403 A1 | 4/2013 | Park et al. | |
| 2013/0095867 A1 | 4/2013 | Kim et al. | |

OTHER PUBLICATIONS

Somasundaram et al., "Semantic-based Grid Resource Discovery and Its Integration with the Grid Service Broker", 2006.*
Amarnath et al., "Ontology-based Grid Resource Management", 2009.*
Qadir et al., "System Architecture for Efficient Grid Resource Management", 2008.*
Kim et al. "Ontology-Based Methodology for Managing Heterogeneous Wireless Sensor Networks", 2013.*
Park et al., "Intelligent service processing in common USN middleware", 2010.*
Yun et al., "Intelligent Management of Remote Facilities through a Ubiquitous Cloud Middleware", 2009.*

* cited by examiner

METHOD AND APPARATUS FOR MANAGING RESOURCE

CROSS-REFERENCE TO RELATED APPLICATION

This application claims priority to and the benefit of Korean Patent Application Nos. 10-2013-0076697 and 10-2014-0040215 filed in the Korean Intellectual Property Office on Jul. 1, 2013 and Apr. 3, 2014, the entire contents of which are incorporated herein by reference.

BACKGROUND OF THE INVENTION (a) Field of the Invention

The present invention relates to a method and an apparatus for managing a resource.

(b) Description of the Related Art

Sensors used in a ubiquitous sensor network (USN) have resource properties for USN services. For anyone to easily use resources such as the sensor, it is important to provide a method for effectively defining resources to use the resources to be suited to a goal of services, in addition to connecting the sensors to the USN. Despite opened resources which may be accessed by anyone, when a user needs to control each resource one by one, a system may not substantially provide useful services.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and an apparatus for managing a resource having advantages of dynamically and efficiently managing a resource.

An exemplary embodiment of the present invention provides a method for managing a resource using an apparatus for managing a resource. The method for managing a resource includes: generating a first instance for a first community using a first ontology class about communities including at least one resource as a member according to a goal; generating a second instance for a first resource using a second ontology class about resources; and estimating a relation between the first instance and the second instance.

The generating of the first instance may include: receiving property information of the first community; and generating the first instance based on a first template using the property information as an input parameter.

The generating of the first instance may include: receiving first information, representing a third instance, that has already been generated for a second community; and generating the first instance based on the first template using a first information as the input parameter.

The first resource may be a first sensor in a sensor network.

The property information may include at least any one of information on a member of the first community, information on a region of the first community, information on lifetime of the first community, and information on a goal of the first community.

The estimating may include estimating a relation between the first instance and the second instance using a semantic relation between the first ontology class and the second ontology class.

The method for managing a resource may further include: generating a third instance for a first space using a third ontology class about a space; and estimating a relation between the first instance and the third instance.

The method for managing a resource may further include: generating a fourth instance for a first time using a fourth ontology class about time; and estimating a relation between the first instance and the fourth instance.

The method for managing a resource may further include: generating a fifth instance for a first goal using a fifth ontology class about a goal of services; and estimating a relation between the first instance and the fifth instance.

The method for managing a resource may further include: estimating a relation between at least any one of the third instance, the fourth instance, and the fifth instance, and the second instance.

The method for managing a resource may further include: generating and storing a sixth instance for a second sensor using the second ontology class when the second sensor is further provided to the sensor network; and determining an instance corresponding to the sixth instance among the instances of the first ontology class by estimating a relation between each of the instances of the first ontology class and the sixth instance.

The method for managing a resource may further include: deleting the second instance when a location of the first sensor is changed; generating a sixth instance for the first sensor at the changed location using the second ontology class; and determining an instance corresponding to the sixth instance among the instances of the first ontology class by estimating a relation between each of the instances of the first ontology class and the sixth instance.

The method for managing a resource may further include: transferring first information on each instance having a semantic relation with the first instance to a state manager managing a state of the first community; and providing the first information to applications through the state manager in response to a request of the applications.

Another embodiment of the present invention provides a method for managing a resource using an apparatus for managing a resource. The method for managing a resource includes: generating a first instance for a first community using a first ontology class representing communities including at least one resource as a member according to a goal; generating a second instance for a first resource using a second ontology class representing resources when the first resource is added; and estimating a relation between the first instance and the second instance.

The method for managing a resource may further include: deleting the second instance when a location of the first source is changed; generating a third instance for the first resource at the changed location using the second ontology class; and estimating a relation between the third instance and the first instance.

The estimating may include estimating a first semantic relation between the second instance and at least one third instance which has a semantic relation with the first instance; and determining whether the second instance corresponds to a member of the first instance based on the first semantic relation. The third instance may be any one of an instance of a third ontology class representing a space, an instance of a fourth ontology class representing time, and an instance of a fifth ontology class representing a goal of services.

Yet another embodiment of the present invention provides an apparatus for managing a resource. The apparatus for managing a resource includes: a first instance generation processor generating a first instance for a first community using a first ontology class representing communities including at least one resource as a member according to a goal; a second instance generation processor generating a second instance for a first resource using a second ontology class representing resources when the first resource is added; and an estimation processor estimating a semantic relation between the first instance and the second instance.

The second instance generation processor may update the second instance based on changed property information when property information of the first resource is changed, and the estimation processor may estimate a semantic relation between the updated second instance and the first instance.

The estimation processor may estimate a first semantic relation between the second instance and at least one third instance which has a semantic relation with the first instance and determine whether the second instance corresponds to a member of the first instance based on the first semantic relation.

The estimation processor may further include: a management processor managing first information on each instance having a semantic relation with the first instance and providing the first information to applications in response to a request of the applications.

DETAILED DESCRIPTION OF THE EMBODIMENTS

Figure 1:
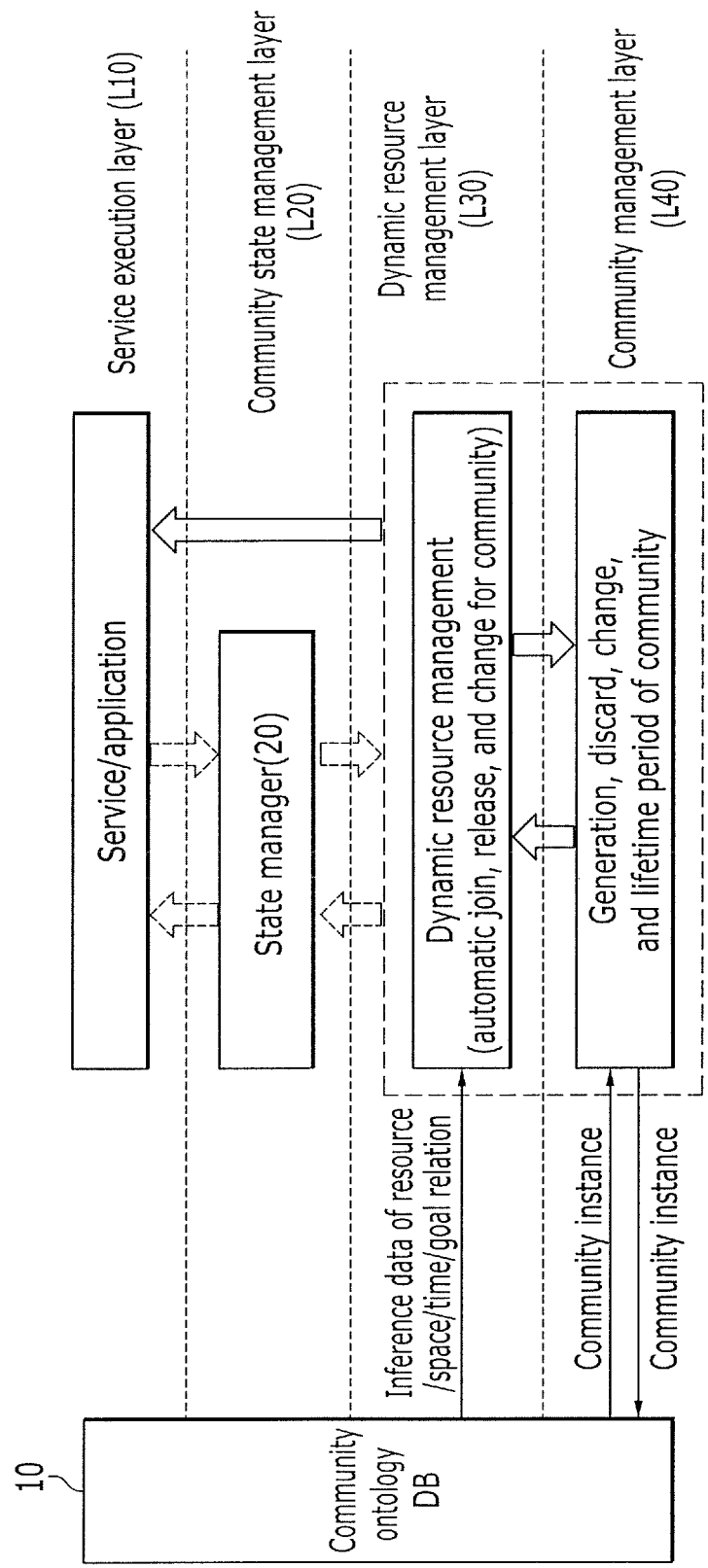
FIG. 1 is a diagram illustrating a concept of a method for managing a resource according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 is a diagram illustrating a concept of a method for managing a resource according to an exemplary embodiment of the present invention. In detail, FIG. 1 illustrates a concept of a method for dynamically managing a resource based on communities using ontology.

To drive or use sensor resources connected to a USN, the typical USN services use a control function of USN middleware. However, to efficiently use many sensor resources in the ubiquitous environment, there is a need for management architecture and service architecture through which a user may efficiently access the sensor resources. To implement the management architecture and the service architecture, a community computing method may be used. To achieve a specific interest (or goal), the community computing method is a method for making entities (or resources) executing services form communities to perform cooperation or to provide services. According to the exemplary embodiment of the present invention, the community computing method using ontology technology dynamically manages resources. In detail, the exemplary embodiment of the present invention has dynamic resource management architecture (for example, autonomous resource subscription (ARS) architecture) based on the community ontology. For example, the ARS architecture is architecture to allow a system to dynamically allocate or release resources to or from communities to be suited to a goal of communities, when properties of resources included (allocated) in the communities are changed or new resources are added under the globally opened environment. Further, the ARS architecture is architecture to join resources in the communities associated with their own properties spontaneously when the resources are added and leave resources from the existing community and join the resources in the communities associated with their own changed properties spontaneously when the properties of resources are changed.

The exemplary embodiment of the present invention may easily analyze properties, such as a goal, spatial information, and geographical information, for constructing the communities using a dynamic resource management mechanism. Further, the exemplary embodiment of the present invention may maintain and manage all the data under the global environment and allocate resources to the communities associated with the properties of resources, using the dynamic resource management mechanism. For example, when positions at which resources (for example, sensor, actuator, and the like) are installed are represented by coordinate values, the exemplary embodiment of the present invention may easily map the coordinate values to an administrative district (for example, City, Gun, Gu, and Dong) or geographical information. Further, the exemplary embodiment of the present invention may obtain relation data by inferring a relation which is not given.

Meanwhile, the ontology is an explicit and formal specification of a conceptualization of a domain of interest. In detail, the ontology may include a class, an instance, a relation, and a property as constituent elements. Standardization and research of an ontology related technology are mainly progressed in www.w3c.org (W3C). As the ontology related standard technology, there are a resource description framework (RDF), an RDF schema (RDFS), an ontology Web language (OWL), a simple protocol and RDF query language (SPARQL), and the like. The ontology related technology is a basic technology for constructing and using the ontology. Characteristics of services may be changed depending on how to perform modeling (for example, class, property, relation, allocation, and the like) the ontology.

To efficiently manage various sensor resources in the USN, the exemplary embodiment of the present invention relates to a mechanism to construct communities based on a combination of the goal, the spatio-temporal information, and the like and dynamically manage the sensor resources based on the community. According to the exemplary embodiment of the present invention, the dynamic management means the community management which may automatically receive a change in the sensor resources due to new installation, movement, discard, and the like of the sensors, and is related to the ontology mechanism which may autonomously perform the function of the community allocation/releasing, and the like of the sensor.

The communities have at least one resource (for example, sensors of USN) as a member according to a goal, and may be connected with temporal information (for example, lifetime information), spatial information (for example, geographical information), and the like. The dynamic resource management (for example, ARS) mechanism means a resource management mechanism which may autonomously join and leave resources in and from the communities spontaneously according to the change in the properties of resources (for example, a sensor). The resource ontology class is an ontology class representing a concept of resources, represents properties of resources (for example, goal, characteristic), and represents a connection relation with another ontology class (for example, community ontology class, temporal ontology class, spatial ontology class, goal ontology class, and the like) based on a schema. The community ontology class is an ontology class about the communities and may have various properties, such as a member, a goal, a life, and an area, The member property which is one of the properties of the community ontology class is associated with the resource ontology class to manage the community-based dynamic resources. The spatial ontology class is an ontology class about a space, and represents a space by a district area (for example, City, Gun, Gu, Dong, and the like), a point of interest (for example, building, specific region, and the like), location coordinates, and the like. The spatial ontology class may have an instance for various types of geographical information and represent the spatial information of resources. The goal ontology class is an ontology class about the goal of communities and represents the goal of communities. The instance may be one fact having the properties of the ontology class, and each ontology class may be a set of instances having the same property. For example, the community ontology class may include at least one community instance, the resource ontology class may include at least one resource instance, the spatial ontology class may include at least one space instance, the temporal ontology class may include at least one time instance, and the goal ontology class may include at least one goal instance.

A community management layer L40 manages the community. In detail, the community management layer L40 may generate, discard, or change the communities or manage a lifetime cycle of the communities. For example, when generating community instances, the community management layer L40 transfers the generated community instances to a community ontology database 10 to be stored. The community management layer L40 provides the information on the communities to a dynamic resource management layer L30.

The community ontology database 10 provides inferred relation data among the ontology classes (for example, resource ontology class, spatial ontology class, temporal ontology class, goal ontology class, and the like) to the dynamic resource management layer L30. In detail, the community ontology database 10 may provide inferred relation data (for example, relation data between community instances and resource instances) between the instances between different ontology classes to the dynamic resource management layer L30.

The dynamic resource management layer L30 dynamically manages resources. In detail, the dynamic resource management layer L30 may allow the resources to perform the join, release, or change for the communities spontaneously. The dynamic resource management layer L30 may provide the information (for example, information on the resources belonging to the community, and the like) associated with the communities to services/applications.

A community state management layer L20 manages a state of communities using a state manager 20. In detail, the state manager 20 may receive and manage the information associated with the communities from the dynamic resource management layer L30 and provide the information associated with the communities to services/applications in response to the request of the services/applications. Further, the exemplary embodiment of the present invention may be designed without the community state management layer L20.

A service execution layer L10 executes services through the application. In detail, the service execution layer L10 may request the information associated with the communities from the state manager 20. However, when no state manager 20 is present, the service execution layer L10 may request the information associated with the communities from the dynamic resource management layer L30.

Figure 2:
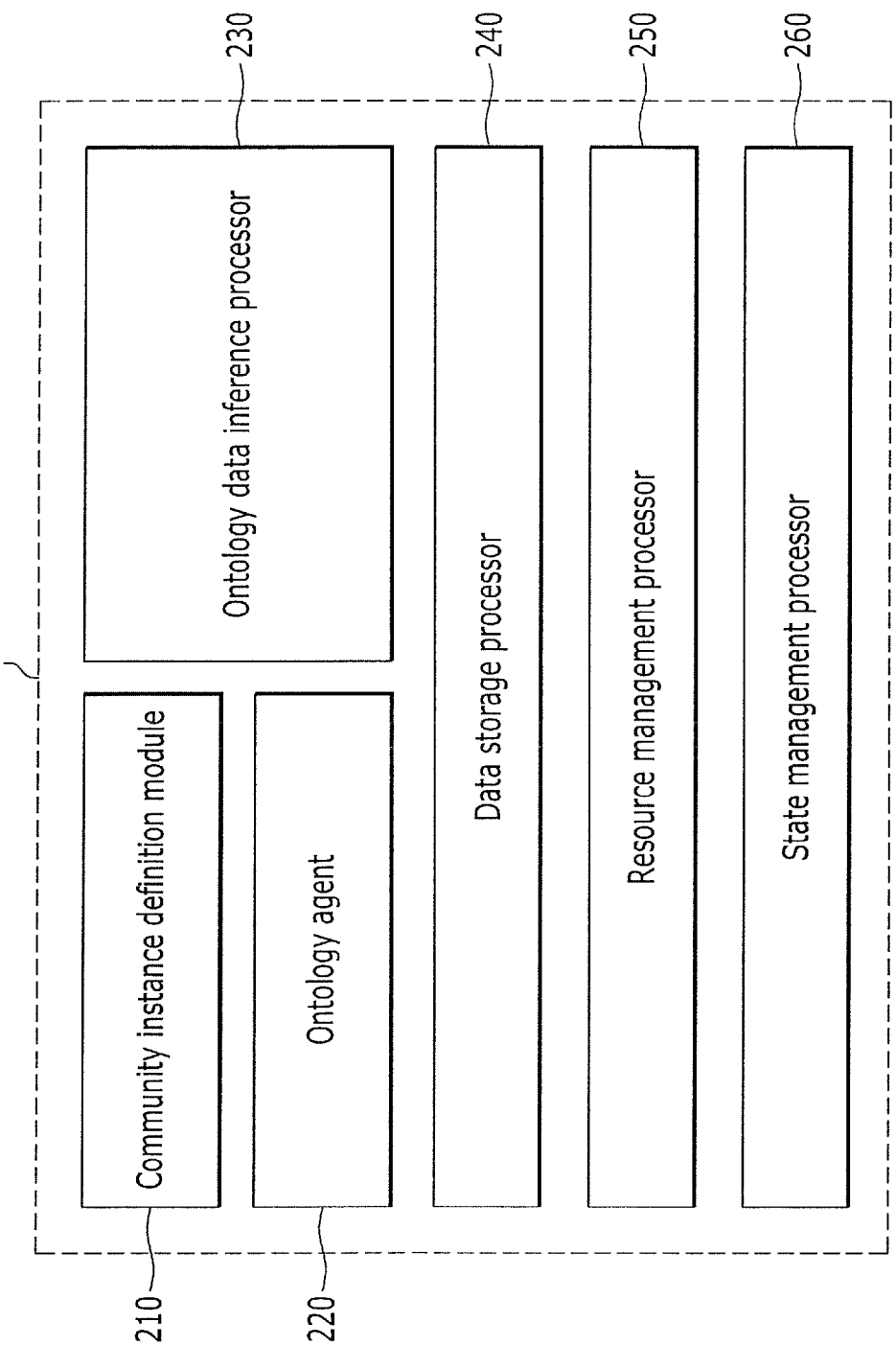
FIG. 2 is a diagram illustrating a configuration of an apparatus for managing a resource according to an exemplary embodiment of the present invention.

FIG. 2 is a diagram illustrating a configuration of an apparatus 200 for managing a resource according to an exemplary embodiment of the present invention.

The apparatus 200 for managing a resource may include a community instance definition module 210, an ontology agent 220, an ontology data inference processor 230, a data storage processor 240, a resource management processor 250, and a state management processor 260.

The community instance definition module 210 specifies (writes) the property information (for example, member, lifetime, resource, time, space, and the like) of communities for dynamic resource management using description logic. The written information is used to generate the community instances.

The data storage processor 240 stores an ontology data model. The ontology data model defines the resources for achieving the goal of communities using the property information of communities In detail, the data storage processor 240 may store the information on the community instances, the resource instances, the space instances, the time instances, the goal instances, and the like.

The resource management processor 250 communicates with the resources through a communication means. When the dynamic change factors (for example, when new resources are installed, when locations of the existing resources are changed, and the like) occur, the resource management processor 250 recognizes the dynamic change in the resources and informs the ontology agent 220 of the changed resources.

The ontology agent 220 receives the dynamic change information of resources from the resource management processor 250. Further, the ontology agent 220 receives the property information of community instances from the community instance definition module 210. The ontology agent 220 converts the received information to be suited to a structure and a type of the ontology data model, and stores the converted structure and type in the data storage processor 240. Further, the ontology agent 220 may query the information stored in the data storage processor 240 in response to the request of the services or the applications and provide the queried information to the services or the applications. Meanwhile, the ontology agent 220 may be designed to include a first instance generation processor generating the community instances and a second instance generation processor generating the resource instances.

The ontology data inference processor 230 infers (or estimates) a semantic relation between newly input information (for example, dynamic change information of resources and property information of community instances) and other information stored in the data storage processor 240. The pieces of information having the semantic relation are connected to each other.

The state management processor 260 manages the state of the community. The state management processor 260 corresponds to the state manager 20 of FIG. 1. Meanwhile, the resource management apparatus 200 may also be designed to not include the state management apparatus 260.

Hereinafter, the method for modeling community ontology data using the apparatus 200 for managing a resource, the method for generating community instances, the method for managing community instances, and the connection between the dynamic resource management mechanism and the services when the new resources are installed or the locations of the existing resources are changed will be described.

1. Community Ontology Data Modeling

In the community-based dynamic resource management method to which the ontology technology is applied, it is very important how the community ontology is defined. The community ontology data modeling may be changed depending on a person defining the ontology data model, and the kind and properties of the ontology class for dynamic resource management may be changed depending on the required range. Hereinafter, for convenience of explanation, the community ontology data modeling will be described under the assumption that the resources are the sensors of the USN. Further, when a kind of resources is changed, the properties of resources or the concept and the relation of the ontology classes may be changed, but the exemplary embodiment of the present invention may be operated in a form including diversity of the ontology data modeling. Referring to FIGS. 3 to 6, the community ontology data modeling will be described in detail.

Figure 3:
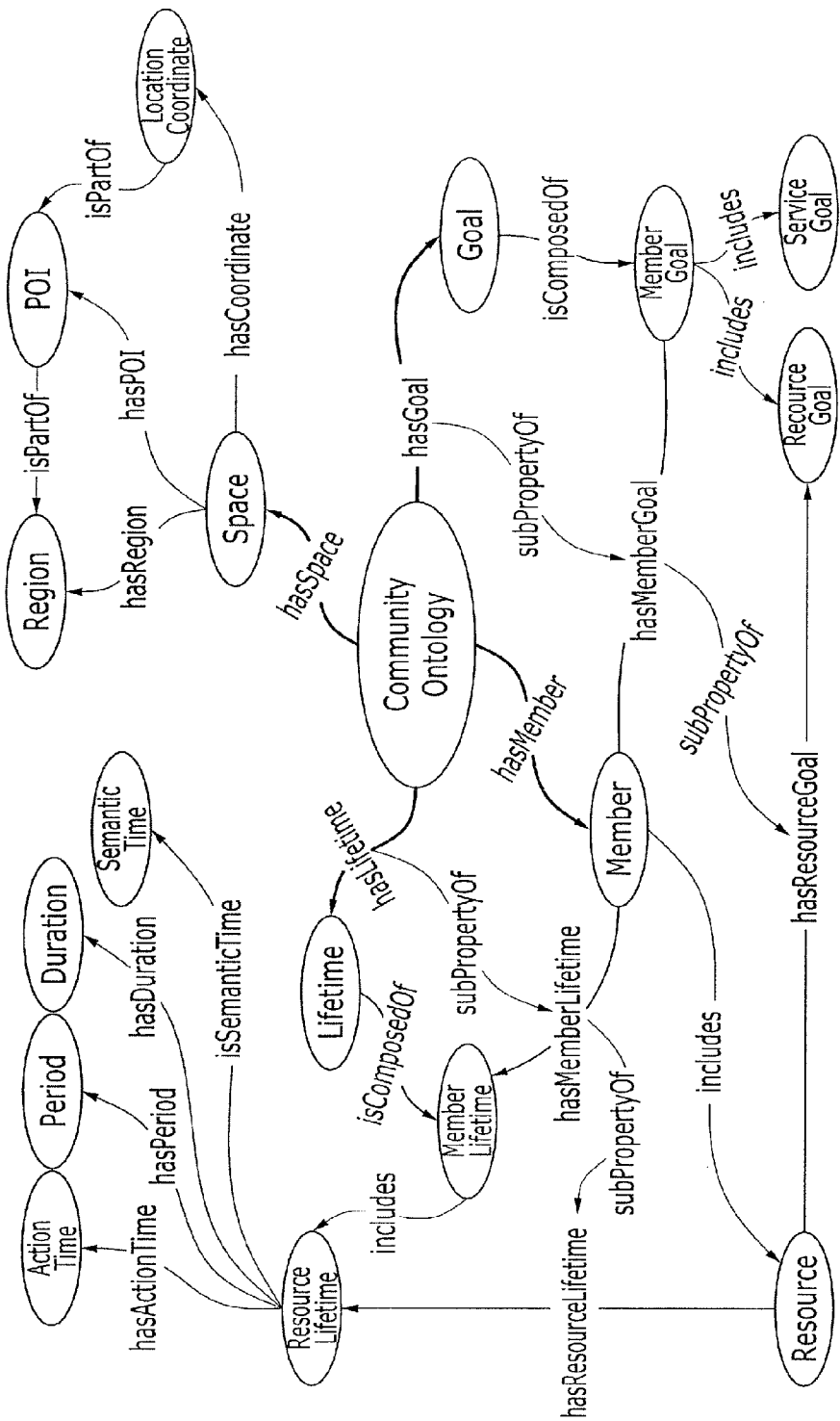
FIG. 3 is a diagram illustrating an example of community ontology data modeling according to an exemplary embodiment of the present invention.

FIG. 3 is a diagram illustrating an example of community ontology data modeling according to an exemplary embodiment of the present invention. In FIG. 3, the case in which the community ontology class has member property, goal property, lifetime property, and space property is assumed.

FIG. 3 illustrates the semantic relation required to construct one community. One community instance has the semantic relation with the instances (for example, resource instances, goal instances, space instances, and time instances) of each ontology class.

Figure 4:
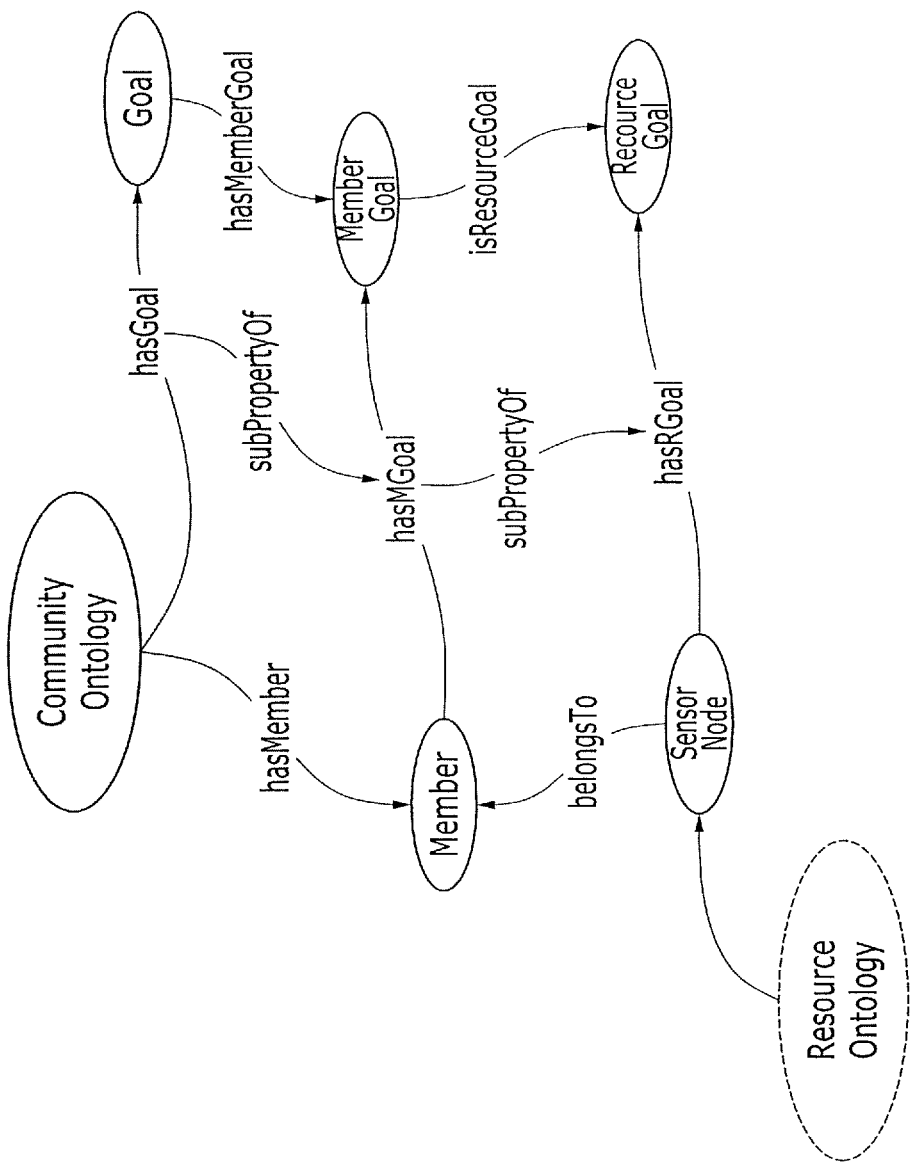
FIG. 4 is a diagram illustrating an example of a relation between the community ontology and resource ontology according to an exemplary embodiment of the present invention.

FIG. 4 is a diagram illustrating an example of a detailed relation between the community ontology and the resource ontology according to an exemplary embodiment of the present invention.

In detail, FIG. 4 illustrates the semantic relation between the properties of a sensor node which is one of the properties of the resource ontology class and the property (for example, member property and goal property) of the community ontology class. In FIG. 4, the member of communities is the sensor node of the resource ontology, in which the sensor node has a resource goal through the relation with the lower class.

Figure 5:
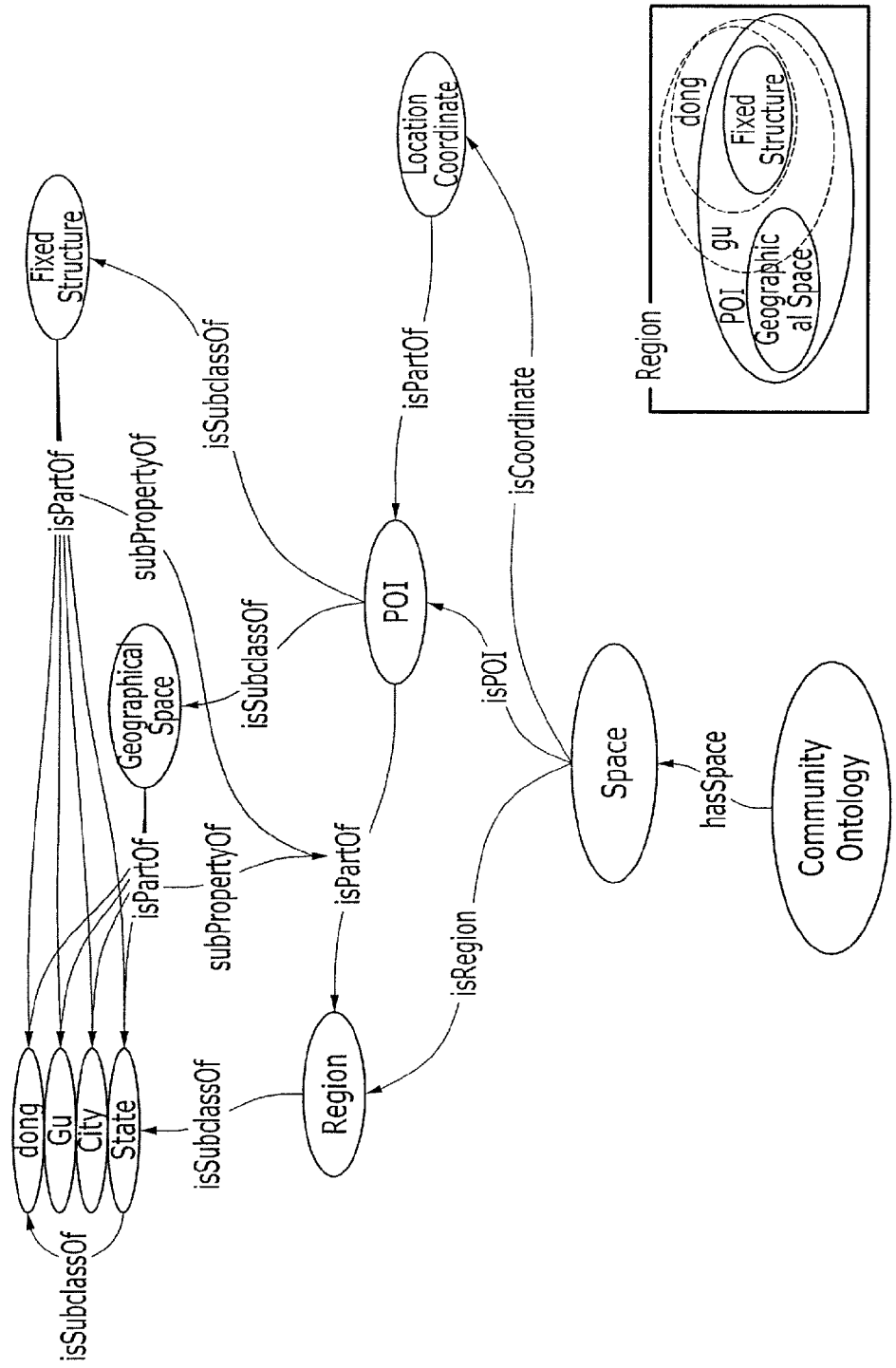
FIG. 5 is a diagram illustrating an example of a relation between the community ontology and a spatial ontology according to an exemplary embodiment of the present invention.

FIG. 5 is a diagram illustrating an example of a detailed relation between the community ontology and the spatial ontology according to an exemplary embodiment of the present invention.

In detail, FIG. 5 illustrates an ontology data structure representing the space properties of the community ontology class. In FIG. 5, the community ontology class is connected with the properties (for example, region class, POI class, and location coordinate class) of the spatial ontology class while having the semantic relation, which represents how the communities may be analyzed in association with the space. That is, the communities may be described as the region (for example, administrative district (State, City, Gu, dong), POI (for example, fixed structure of geographical space, building, and the like)), location coordinates, and the like, in association with the space property. As illustrated in FIG. 5, the properties of each spatial ontology class have the connection relation with each other, and the space property information (for example, location coordinates) may be converted into another space property information (for example, POI) based on the connection relation.

Figure 6:
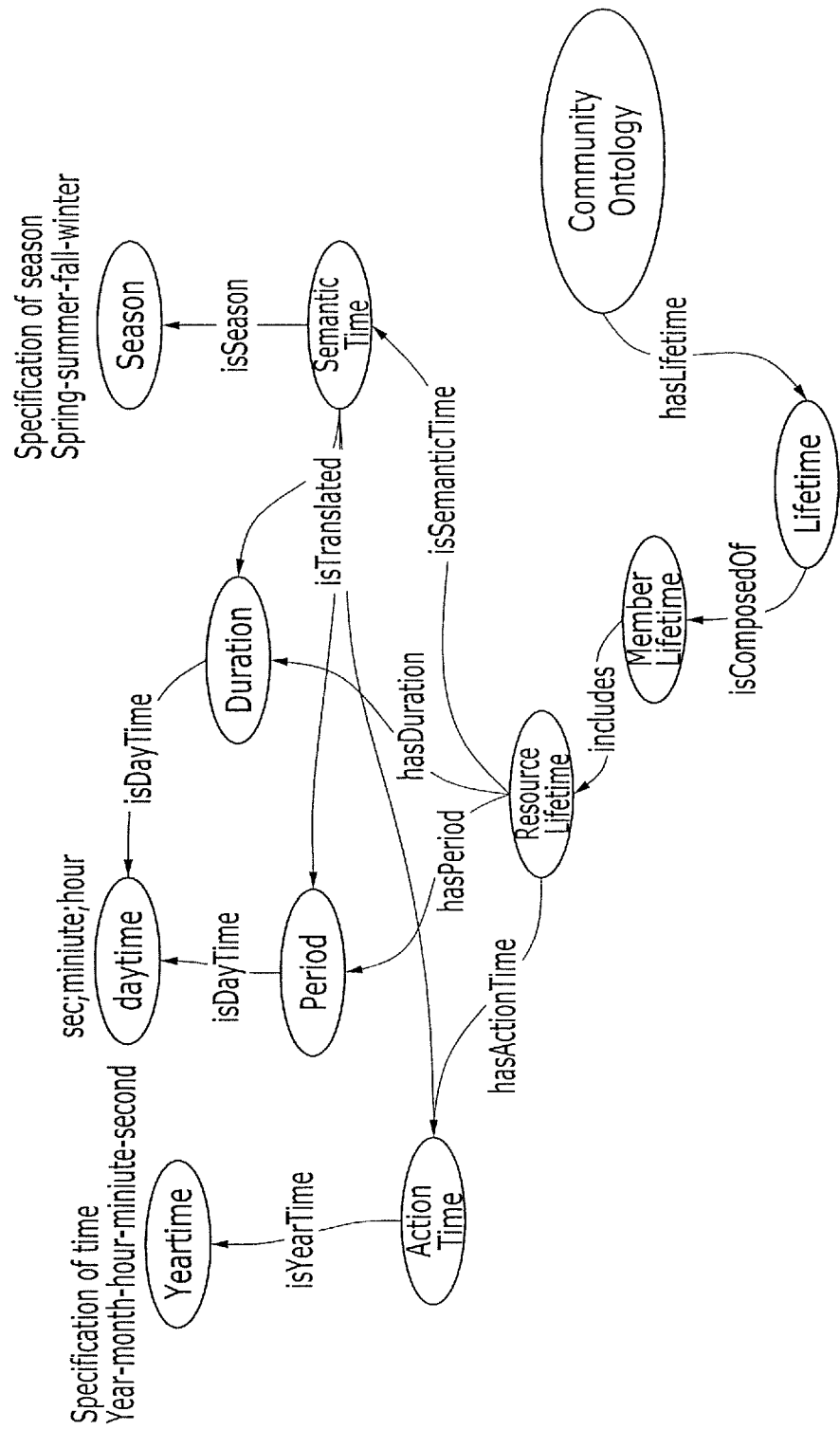
FIG. 6 is a diagram illustrating an example of a relation between the community ontology and temporal ontology according to an exemplary embodiment of the present invention.

FIG. 6 is a diagram illustrating an example of a relation between the community ontology and the temporal ontology according to an exemplary embodiment of the present invention.

In detail, FIG. 6 illustrates the ontology data structure representing the lifetime properties of the community ontology class. As illustrated in FIG. 6, the property associated with time that persons put a meaning to may be analyzed as action time properties of the temporal ontology class, period property, duration property, or semantic time (season, day, night, and the like). To specify (write) the most fundamental time, yeartime (year, month, day, hour, minute, second) property and daytime (hour, minute, second) property may be used. To specify (write) resource lifetime, the action time property, the period property, the duration property, and the semantic time property may be used.

Figure 7:
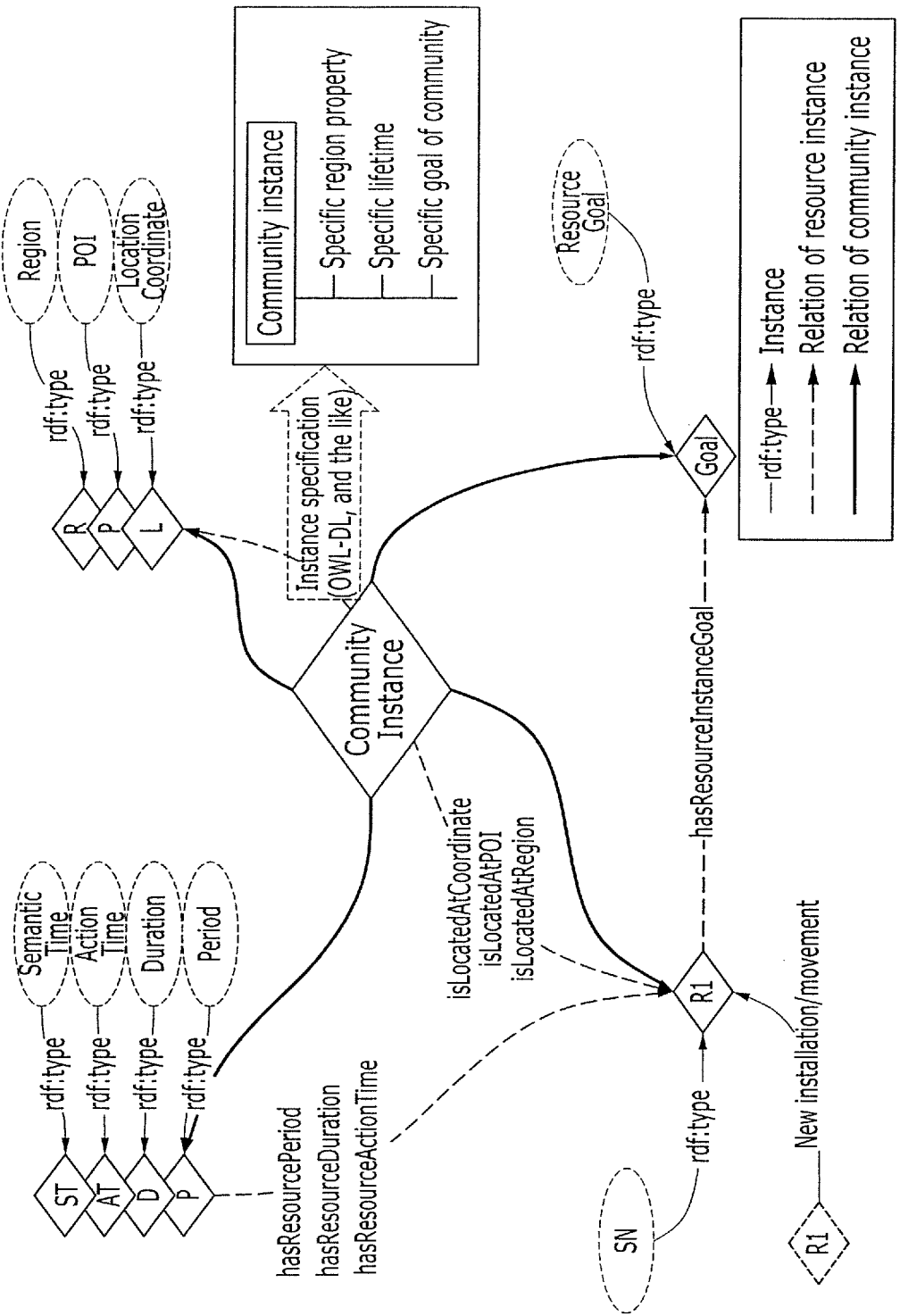
FIG. 7 is a diagram illustrating a relation between a generated instance and another instance, when an instance of the community ontology class is generated according to an exemplary embodiment of the present invention.

FIG. 7 is a diagram illustrating a relation between an instance of a community ontology class generated according to an exemplary embodiment of the present invention and another instance.

In detail, FIG. 7 illustrates how the generated community instances are analyzed based on the ontology data model, when the instance belonging to the community ontology class is generated. As illustrated in FIG. 7, the community instances have the semantic relation with space instances (for example, R, P, and L) of the spatial ontology class, time instances (for example, ST, AT, D, and P) of the temporal ontology class, goal instances (for example, goal) of the goal ontology class, resource instances (for example, R1) of the resource ontology class, respectively. Further, as illustrated in FIG. 7, when the sensors are newly installed or the installation locations of the sensors are changed, the resource instance R1 for the corresponding sensor is generated. The generated resource instance R1 has the semantic relation with the space instances (for example, R, P, and L) of the spatial ontology class, the time instances (for example, ST, AT, D, and P) of the temporal ontology class, and the goal instances (for example, goal) of the goal ontology class, respectively. Meanwhile, the community instances may be specified (written) using semantic representation languages (for example, OWL-DL, and the like).

Meanwhile, one community instance may be defined based on a template application program interface (API), and the like. In detail, in the ontology data model, the properties of the community ontology class may be defined based on the template API, and the like. The ontology data model defined as illustrated in FIGS. 3 to 7 is stored in the data storage processor 240. In detail, the ontology data model may be stored in the data storage processor 240 as an RDF triple structure (subject, predicate, and object).

2. Generation of Community Instance

The community instance definition module 210 may allow the user or the applications to specify (write) basic property information of communities for dynamic resource management. To this end, the community instance definition module 210 may include an interface. In detail, the community instance definition module 210 may include the template based API (hereinafter referred to as 'template API') which may allow the user or the applications to input the property information (for example, space, goal, lifetime, and the like) of communities or a program interface of a type similar to the template API.

The template API is an input interface provided to the user or the applications to define the community instances. In detail, the template API may specify the resources for community instances based on the logical logic (for example, AND operation, OR operation, and the like) for the input information. The template API includes a basic template and a composite template.

The basic template uses the properties of communities to be generated as input parameters to define the community instances based on a logic operation between the input parameters. For example, depending on the following Equation 1, when 'Daejeon' as the space property information, 'sensor' as the member property information, 'temperature' as the goal property information, and 'from one to nine' as the time property information are input, a community instance C1 may be defined as "a sensor community operated from one to nine and measuring temperature of Daejeon region' based on the basic template.

$$C1=\{\text{Region (Daejeon)} \cap \text{Resource type (sensor)} \cap \text{Goal (temperature)} \cap \text{Time (from one to nine)}\} \quad \text{(Equation 1)}$$

The composite template uses the already generated community instances as input parameters to define the community instances based on the operation between input parameters. In detail, the composite template may define new community instances based on the operation between at least two community instances or define new community instances based on the operation between property information of communities to be generated and at least one community instance. For example, depending on the following Equation 2, when the information representing a community instance C1 and 'humidity' as the goal property information are input as parameters, a community instance C2 may be defined "as a sensor community operated from one to nine based on the composite template and measuring temperature and humidity of Daejeon region" based on the composite template.

$$C2=\{\text{Community (C1)}+\text{Goal (humidity)}\} \quad \text{(Equation 2)}$$

As another example, depending on the following Equation 3, when information representing the community instance C1 and information representing a community instance C3 which is "a sensor community measuring humidity of Seoul region" are input as a parameter, a community instance C4 may be defined as "a sensor community measuring temperature of Daejeon region and humidity of Seoul region".

$$C4=\{\text{Community (C1)}+\text{Community (C3)}\} \quad \text{(Equation 3)}$$

Meanwhile, the property information input as the parameter of the template API may include region information (for example, City, Gun, Gu, Dong, coordinates, and the like), the goal (for example, temperature measurement, humidity measurement, pollution measurement, atmospheric condition, traffic condition, and the like) of communities, lifetime information (creation and extinction time of communities instance, service period of resources, and the like) of communities, and the like.

Meanwhile, the community instances specified (written) by the community instance definition module 210 may include information for constructing the semantic relation with the instance (for example, resource instance, space instance, and the like) of another ontology class on the ontology. The information for constructing the semantic relation needs to be represented as a specific rule or a language which may be determined by a computer and the template API for defining the community instances may have architecture to allow the user or the applications to specify (write) various property information.

3. Community Instance Management

The property information of communities input through the community instance definition module 210 may be represented by a language (semantic representation language such as OWL-DL) which specifies (writes) one community instance depending on the designed logic. The ontology agent 220 converts the property information of communities received from the community instance definition module 210 into a form connected with the defined ontology data model depending on a community ontology schema to be stored in the data storage processor 240 as the community instances of the community ontology class. The new community instances stored in the data storage processor 240 are connected with the instances of each ontology class based on the relation between the ontology classes which are previously constructed for dynamic resource management. Further, the ontology data inference processor 230 may additionally infer the semantic relation between the new community instances and the instances of each ontology class which are stored in the data storage processor 240.

A process of processing community instances will be described in detail with reference to the exemplary embodiment of the present invention illustrated in FIG. 7. For example, when the community instance C1 having (region property called 'Daejeon', lifetime property called 'from one to nine', and goal property called 'temperature') is generated, the space instances corresponding to 'Daejeon' which is the region property are generated based on the spatial ontology schema. The generated space instances inherit the semantic relation schema between the spatial ontology class model and the community ontology class model. In this way, the generated space instances have the semantic relation with the community instance C1. Further, in addition to the semantic relation, an additional semantic relation between the community instance C1 and the instance of another ontology class may also be inferred (or analyzed) by the ontology data inference processor 230. In this way, the semantic relation structure between the community instance C1 and the instance of another ontology class may be generated. Meanwhile, when the apparatus 200 for managing a resource intends to manage the sensor resources located in the 'Daejeon' region as the member of communities based on the properties of communities associated with the 'Daejeon' region, there is a need to figure out the sensors located in the 'Daejeon' region. The apparatus 200 for managing a resource figures out the sensor instances associated with 'Daejeon' which is the region property of the community instance C1 generated from all the resource instances belonging to the resource ontology class. To this end, the sensor instances which are the resource instances of the resource ontology class have the information (for example, coordinates and the like) on locations in which the sensor instances are installed as the property information. By the relation structure, the sensor instances associated with 'Daejeon' which is the region properties of communities may be connected with the community instance C1 as the member of the generated community instance C1. Similarly, the time instances corresponding to 'from one to nine' which is the lifetime property and the goal instances corresponding to 'temperature' which is the goal property also have the semantic relation with the community instance C1. In particular, similar to the region properties, the goal properties of community instances are an important property for determining the member of communities. For example, when the goal property of the community instance C1 is to figure out the temperature of a region, the apparatus 200 for managing a resource may again figure out the sensor instances having the temperature measurement function among the sensor instances of the 'Daegeon' region which are previously understood as the member of the community instance C1.

Figure 8:
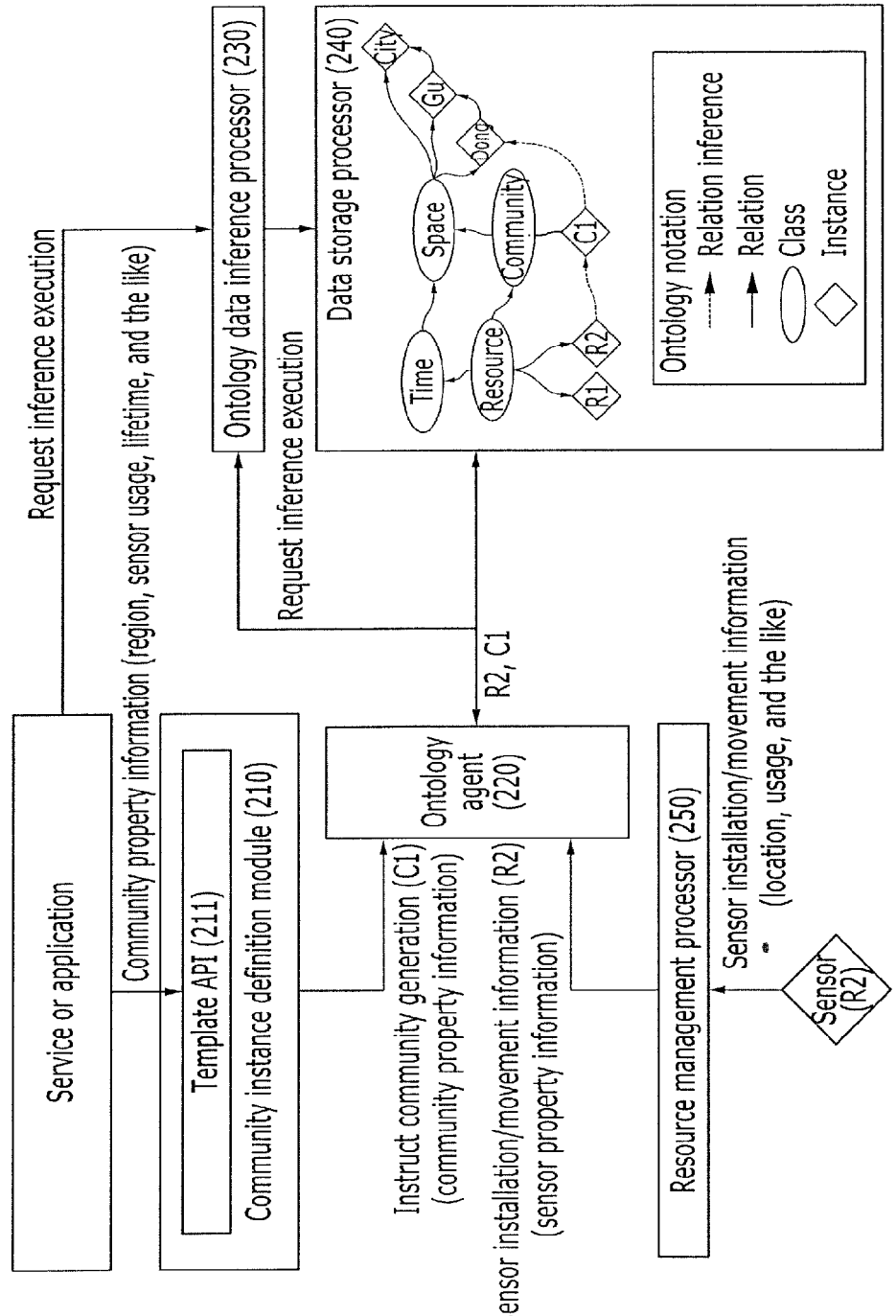
FIG. 8 is a diagram illustrating an overall process of managing a resource using the apparatus for managing a resource according to the exemplary embodiment of the present invention.

4. Dynamic Resource Management Mechanism when Dynamic Change Factor of Resource Occurs A process of managing a resource using the apparatus 200 for managing a resource will be described with reference to FIGS. 8 to 10. FIG. 8 is a diagram illustrating an overall process of managing a resource using the apparatus 200 for managing a resource according to the exemplary embodiment of the present invention.

First, the case in which the apparatus 200 for managing a resource generates new community instances (for example, C1) will be briefly described. As described above, the community instance definition module 210 receives the property information (for example, region property called 'Daejeon', goal property called 'temperature', lifetime property 'from one to nine') of communities to be generated by the user or the applications using the template API 211. Further, the community instance definition module 210 requests the generation of the community instance C1 corresponding to the input information to the ontology agent 220. The ontology agent 220 generates the community instance C1 and stores the generated community instance C1 in the data storage processor 240.

Hereinafter, when the dynamic change factors of resources occur, the dynamic resource management mechanism of the apparatus 200 for managing a resource will be described. For the dynamic resource management mechanism, when the dynamic change factors of resources occur, the apparatus 200 for managing a resource determines whether the resources in the changed state match any of the community instances. In detail, the ontology data inference processor 230 determines whether the resources in the changed state match any of the community instances. For example, when the services or the applications using the community instances request the inference execution, the ontology data inference processor 230 may perform the determination operation. Alternatively, the ontology data inference processor 230 may also perform the determination operation when the ontology agent 220 reported about the dynamic change factors of resources requests the inference execution.

For convenience of explanation, the dynamic resource management mechanism of the apparatus 200 for managing a resource will be described with reference to, as an example, the case in which the new sensor resources are installed or the location of the already installed sensors are changed. When one sensor represented by the location information which is a 'first coordinate value' and the goal information which is 'temperature' is installed in the USN, the resource management processor 250 may be automatically reported about the first coordinate value which is the property information of the installed sensors, the temperature sensor, and the like, from the installed sensors and may request the installed sensors to report the first coordinate value, the temperature sensor, and the like. The resource management processor 250 transfers the information reported from the installed sensors to the ontology agent 200. The ontology agent 220 uses the resource ontology class to generate a resource instance R2 corresponding to the received information and store the generated resource instance R2 in the data storage processor 230.

Meanwhile, when the locations of the installed sensors are changed, the sensors may automatically report their own changed location information to the resource management processor 250 or may report the changed location information in response to the request of the resource management processor 250. The resource management processor 250 transfers the information (changed location information) reported from the sensors to the ontology agent 220. The ontology agent 220 updates the resource instances for the corresponding sensors based on the received information. In detail, the ontology agent 220 may delete the resource instances for the corresponding sensors which are stored in the data storage processor 240 and is at a location before being changed. Further, the ontology agent 220 may generate the resource instances for the corresponding sensors at the changed location and store the generated resource instances in the data storage processor 240.

As a result, the resource instances (for example, R2) of the resource ontology class based on the ontology data model are newly stored in the data storage processor 240. Meanwhile, for the dynamic resource management, each ontology class (for example, temporal ontology class, resource ontology class, community ontology class, spatial ontology class, and the like) already has the semantic relation according to the schema based on the ontology data modeling. For example, the semantic relation between the resource ontology class and the community ontology class, the semantic relation between the resource ontology class and the spatial ontology class, and the like are stored in advance. Meanwhile, for the dynamic resource management, if necessary, the new ontology class may be defined or the previously defined ontology classes may be connected and used.

Meanwhile, as described in '3. community instance management', according to the dynamic resource management mechanism of the apparatus 200 for managing a resource, the location coordinate values (for example, first coordinate value) of the resource instances (for example, R2) for the sensors which are newly installed or have the changed locations may be connected with the POI properties or the region properties of the spatial ontology class. By doing so, the location coordinate values of the updated resource instances (for example, R2) may be converted into the form of the POI property information or the region property information and analyzed. The analysis process is performed by the ontology data inference processor 230. The inference time of the ontology data inference processor 230 may be designed to be time suitable to smoothly provide services. In detail, the ontology data inference processor 230 may execute the inference at the time when the resource instances (for example, R2) are stored in the data storage processor 230, the time (for example, C1) when the community instances are stored, or the time when the inference execution of services is requested.

As a result, by the ontology data inference processor 230, the relation between the resource instances (for example, R2) and the community instances (for example, C1) is represented by the information structure connected to each other, and each source instance (for example, R2) is connected with the spatial ontology class and thus is connected with the related region information.

Based on the connected information structure on the ontology and the inference function based on the connected information structure, the apparatus 200 for managing a resource may automatically determine whether the newly generated resource instances (for example, resource instances for new sensors or resource instances for sensors of which the locations are changed) correspond to any of the currently existing community instances. Therefore, based on the method for generating community instances having various properties, the method for inferring resource instances connected with the generated community instances, and the method for inferring community instances corresponding to the generated resource instances according to the exemplary embodiment of the present invention, the dynamic resource management mechanism based on the communities having various properties may be efficiently supported. The dynamic resource management mechanism according to the exemplary embodiment of the present invention will be described in more detail with reference to FIGS. 9 and 10.

Figure 9:
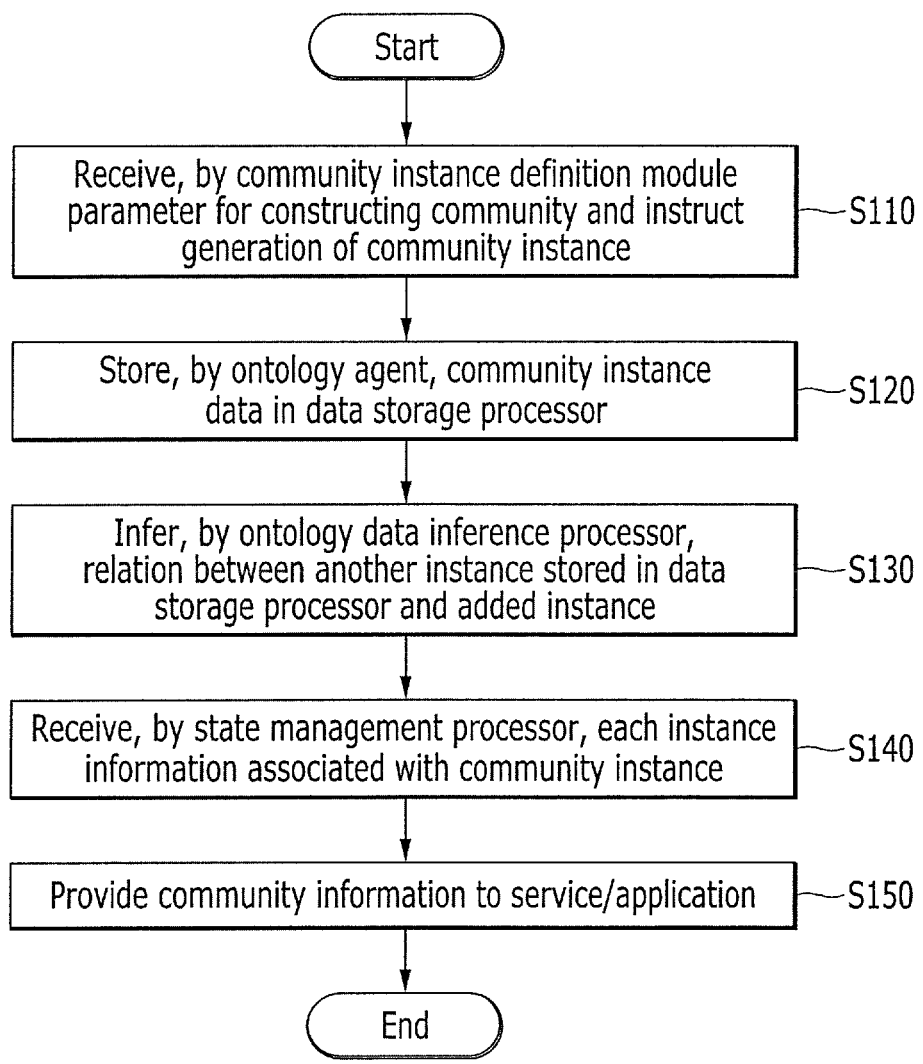
FIG. 9 is a diagram illustrating a process of generating and managing community instances using the apparatus for managing a resource according to the exemplary embodiment of the present invention.

FIG. 9 is a diagram illustrating a process of generating and managing community instances using the apparatus 200 for managing a resource according to the exemplary embodiment of the present invention.

The community instance definition module 210 receives the property information of communities to be generated through the input interface and requests the ontology agent 220 to generate the community instances corresponding to the input information (S110).

The ontology agent 220 generates the community instances based on the community ontology schema and stores the generated community instances in the data storage processor 240.

The ontology data inference processor 230 infers the semantic relation between the community instances generated in S120 and instances (for example, resource instance, space instance, time instance, goal instance, and the like) of another ontology class stored in the data storage processor 240 (S130). In detail, the ontology data inference processor 230 may perform process S130 in response to the inference execution request from the ontology agent 220. Alternatively, the ontology data processor 230 may perform a process of S130 in response to the inference execution request from the services or the applications.

The state management processor 260 receives the results inferred in S130 from the ontology data inference processor 230 and manages the received results (S140). In detail, the state management processor 260 may manage the information on the instances (for examples, resource instances, space instances, time stances, goal instances, and the like) of another ontology class associated with the community instances.

The state management processor 260 provides the information on the corresponding community to the services or the applications in response to the community information query request from the services or the applications (S150). Herein, the information provided to the services or the applications may include the information on the resources associated with the corresponding community, the service information (for example, measured temperature information, and the like) provided by the corresponding community, and the like.

Meanwhile, when the apparatus 200 for managing a resource is designed to not include the state management processor 260, processes S140 and S150 will be omitted. In detail, when the apparatus 200 for managing a resource does not include the state management processor 260, the ontology agent 220 may provide the information on the corresponding community to the services or the applications in response to the community information query request from the services or the applications.

Figure 10:
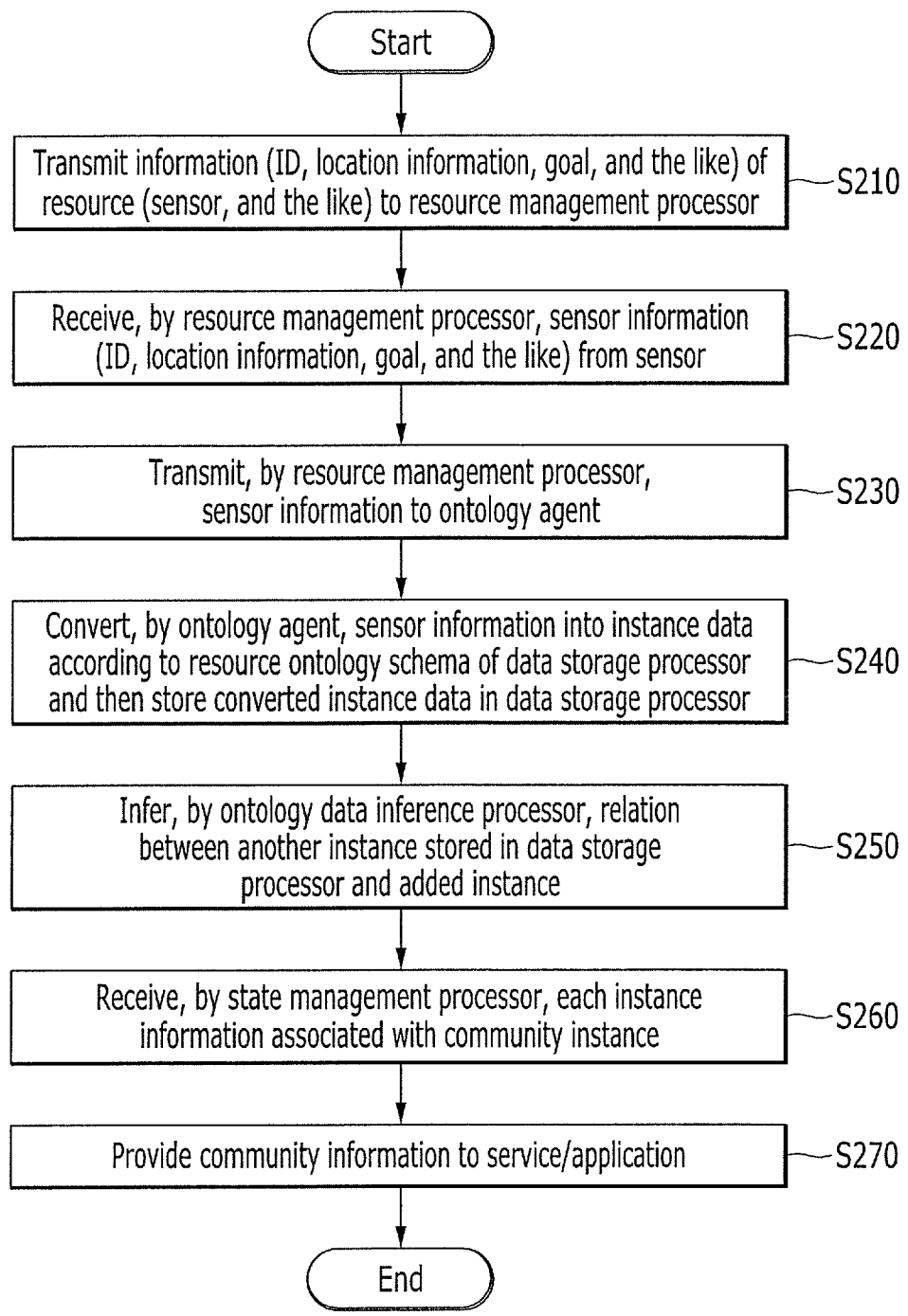
FIG. 10 is a diagram illustrating a process of allowing the apparatus for managing a resource according to the exemplary embodiment of the present invention to generate and manage resource instances.

FIG. 10 is a diagram illustrating a process of generating and managing resource instances using the apparatus 200 for managing a resource according to the exemplary embodiment of the present invention.

When resources are newly installed or the previously installed resources move, the corresponding resources report their own property information (for example, ID, location information, goal, and the like) to the resource management processor 250 (S210). In FIG. 10, for convenience of explanation, the description will be made under the assumption that the resources are the sensors will be described.

The resource management processor 250 receives the property information of the sensors from the sensors (S220). The resource management processor 250 registers the sensors transmitting the property information. Further, the resource management processor 250 transmits the received property information of the sensors to the ontology agent 220 (S230).

The ontology agent 220 converts the received property information of the sensors into the resource instance data depending on the resource ontology schema stored in the data storage processor 240. Further, the ontology agent 220 stores the converted resource instance data in the data storage processor 240 (S240).

The ontology data inference processor 230 infers the semantic relation between the resource instances generated in S240 and instances (for example, community instances, space instances, time instances, goal instances, and the like) of another ontology class stored in the data storage processor 240 (S250). In detail, the ontology data inference processor 230 may perform process S250 in response to the inference execution request from the ontology agent 220 or the inference execution request from the services (or applications). Based on process S250, the ontology data interference processor 230 may determine whether the generated resource instances correspond to any of the stored community instances.

The state management processor 260 receives the results inferred in S250 from the ontology data inference processor 230 and manages the received results (S260). In detail, the state management processor 260 may manage the information on the instances (for examples, resource instances, space instances, time stances, goal instances, and the like) of another ontology class associated with the community instance.

The state management processor 260 provides the information on the corresponding community to the services or the applications in response to the community information query request from the services or the applications (S260).

Meanwhile, when the apparatus 200 for managing a resource is designed to not include the state management processor 260, processes S250 and S260 will be omitted. In detail, when the apparatus 200 for managing a resource does not include the state management processor 260, the ontology agent 220 may provide the information on the corresponding community to the services or the applications in response to the community information query request from the services or the applications.

5. Connection with Service

According to the exemplary embodiment of the present invention, even though the dynamic change factors of resources such as the new installation of the sensors, the location movement of the sensors, and the like occur, the applications receiving the services through the communities need not directly perform the management for the dynamic change. In detail, the dynamic resource management mechanism according to the exemplary embodiment of the present invention may automatically reflect the dynamic change factors of resources to the community instances connected with each service. Consequently, the services or the applications using the communities need not manage the dynamic change of resources which occur within each community. Therefore, as illustrated in FIG. 1, the services or the applications are enough to manage only the state of communities, and therefore the resources may be efficiently used.

Meanwhile, for more efficient community-based dynamic resource management, the apparatus 200 for managing a resource may include the state management processor 260 as described above. In detail, as illustrated in FIG. 1, the services or the applications do not acquire the update information of communities from the ontology data storage processor 240 or the ontology agent 220, and may also acquire the update information of communities from the state management processor 260 or the state manager 20. That is, the performance of services may be improved by the state management processor 260 which serves as a cache memory.

In detail, in FIG. 1, the state manager 20 is continuously reported on the change information of resources, and the like which belong to the communities, from the dynamic source management layer L30, and may efficiently transfer the reported information to the services or the applications. In this aspect, the state manager 20 or the state management processor 260 may be designed to have the structure and performance which may more rapidly and accurately query the community related information than the data storage processor 240. The data storage processor 240 stores data in the RDF triple form and stores various semantic relations for processing the semantic data, and therefore performing the data storage processor 240 to query the data set having the specific semantic relation every time may deteriorate the performance of the apparatus 200 for managing a resource. Therefore, for the community construction, when the data set having the specific semantic relation is defined, the apparatus 200 for managing a resource may construct the database for more efficiently querying the data set. Further, the state manager 20 or the state management processor 260 may manage the database.

The case in which the exemplary embodiment of the present invention manages the resources of the USN is described hereinabove, but it is only an example. The exemplary embodiment of the present invention may be applied to the system using the sensors and all the systems using the resources.

According to the exemplary embodiments of the present invention, it is possible to generate communities by grouping resources (for example, sensor) according to the goal or the condition using the semantic ontology method for the user to easily use the resources and dynamically manage the resources based on the communities.

Further, according to the exemplary embodiments of the present invention, it is possible to automatically manage the dynamic change factors of resources in the system dimension regardless of the services or the applications. Further, it is possible for any service or application to more conveniently use the resources using the community-based dynamic management mechanism.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of managing various sensor resources in a ubiquitous sensor network using ontology technology, comprising the steps of:
    setting a goal for a computing community;
    constructing a computing community within the sensor network based on the goal of the community, wherein the community contains at least one resource having at least one property, wherein the resource has been allocated to the community based on a match between the at least one property of the resource and the goal of the community; and
    using a dynamic resource management architecture to:
        detect a change in the at least one property of the resource, wherein the changed property of the resource no longer satisfies the goal of the community;
        release the resource from the community based on the changed property of the resource;
        detect a second resource in the ubiquitous sensor network based on at least one matched property of the second resource and the goal of the community; and
        allocate the second resource to the community.

2. The method of claim 1, wherein the at least one property of the resource is location.

3. The method of claim 1, wherein the at least one property of the resource is a duration of availability.

* * * * *